United States Patent [19]

Johnson et al.

[11] Patent Number: 4,540,487

[45] Date of Patent: Sep. 10, 1985

[54] FILTER APPARATUS

[75] Inventors: John K. Johnson, Stillman Valley; Jack R. Earhart, Roscoe; Gordon L. Astrom, Mount Morris; Mark A. Herbig, Roscoe, all of Ill.

[73] Assignee: Aqua-Aerobic Systems, Inc., Rockford, Ill.

[21] Appl. No.: 614,948

[22] Filed: May 29, 1984

[51] Int. Cl.³ .................. B01D 23/24; B01D 23/16
[52] U.S. Cl. ............................. 210/264; 210/271; 210/276; 210/286
[58] Field of Search ........ 210/264, 271, 273, 275–277, 210/386, 333.1, 411, 678

[56] References Cited

U.S. PATENT DOCUMENTS

| | | | |
|---|---|---|---|
| 2,302,449 | 11/1942 | Laughlin | 210/271 X |
| 2,302,450 | 11/1942 | Laughlin | 210/264 |
| 2,679,319 | 5/1954 | Walker | 210/276 X |
| 3,239,061 | 3/1966 | Horning et al. | 210/276 X |
| 4,133,766 | 1/1979 | Adie | 210/275 |
| 4,152,625 | 5/1979 | Meyers | 210/276 X |
| 4,308,141 | 12/1981 | Clendenen | 210/264 |
| 4,454,034 | 6/1984 | Astrom et al. | 210/264 X |

FOREIGN PATENT DOCUMENTS

868139  5/1961  United Kingdom ................ 210/275

Primary Examiner—Robert Spitzer
Attorney, Agent, or Firm—Vernon J. Pillote

[57] ABSTRACT

A filter apparatus in which a generally horizontal bed of filter material is supported in a tank on a porous support above the bottom of the tank and is divided by spaced partitions into individual filter cells above the support and individual filter compartments below the support, and a carriage is mounted for movement along the filter bed and has a collector hood that moves along the top of the bed to collect backwash effluent therefrom and a backwash head arranged to direct backwash fluid into the compartments below the porous support to sequentially backwash the filter cells. A cell scavenging head is mounted on the carriage for movement along the filter bed and arranged to sequentially withdraw fluid from each filter compartment and down-flow scavenge and rinse the associated filter cell subsequent to backwashing of each filter cell.

24 Claims, 7 Drawing Figures

Fig. 1.

FILTER APPARATUS

It is common practice to backwash filters by passing water upwardly through the bed at a sufficient rate to expand the bed of filter material and wash the particulate and suspended solids from the bed. Such backwashing requires a relatively high flow rate per unit of the filter area being backwashed and the total backwash flow rate becomes very high for filters having a large filter area. In order to limit the maximum flow rates required during backwashing, some filters have been divided into multiple sections or cells which can be backwashed individually. In some multi-section filters such as disclosed in U.S. Pat. No. 2,679,319, the underdrains below the filter beds in the several sections of the bed are connected through individual valves to a header, and the header is arranged to be connected through other valves to either a treated water effluent line during the filter run or to a backwash water inlet line for backwashing. This patent also discloses that the header which is used to pass filtered water from the underdrains and the backwash water to the underdrains below the filter bed, can also be connected through other valves to a sewer to enable draining of the first water that is run through the filter in a normal direction after backwashing the filter. Such multi-section filters require a large number of valves to control the flows to and from the multiple filter sections and are expensive to construct and complex to operate.

The present invention relates to a filter apparatus of the type in which the filter bed is backwashed by a travelling backwash means that progresses along the tank, for example as disclosed in U.S. Pat. Nos. 2,302,449 3,239,061 and 4,152,265. In general, such filter apparatus include a filter bed supported above the bottom of the tank on a generally horizontal filter bed support with partitions provided at spaced locations along the tank to divide the underdrain below the filter bed support into a plurality of filtrate compartments that each communicate at one end through a filtrate port with a filtrate launder extending along the tank. The fluid to be filtered is supplied to the tank above the bed of filter material and passes downwardly through the bed of filter material into the filtrate compartments and out of the filtrate compartments through the filtrate ports into the filtrate launder to a discharge outlet. The bed of filter material is progressively cleaned by a backwash apparatus that is mounted on a carriage for movement along the bed to backwash different sections of the filter bed in a predetermined sequence. The backwash apparatus includes a collector hood that moves along a path over the top of the filter bed to collect backwash effluent. Commonly, the backwash apparatus also includes a backwash head that moves through the filtrate launder sequentially in communication with the filtrate ports to supply backwash fluid to the filtrate compartments at the underside of the filter bed support. With this type of filter apparatus, the filtrate compartments are in open communication through their filtrate ports with the filtrate launder and fluid normally passes down through the filter bed and through the filtrate compartments into the filtrate launder. During backwashing of each section of the filter bed, the hood interrupts downflow through the section of the filter bed below the hood and, when the backwash means is operated, backwash fluid flows in the reverse direction through the filtrate port into the filtrate compartment to up-flow backwash the filter section. As the carriage moves along the tank, the collector hood moves out of overlying relation with the section of the filter bed that has been backwashed and into overlying relation with a succeeding filter section and stops backwashing of one filter section and starts backwashing of the succeeding filter section. When the filter section that has been backwashed is returned to filter service, fluid again passes down through the bed in the filter section into the filtrate compartment therebelow and out through the associated filtrate port into the filtrate launder.

The fluid used in backwashing the filter is normally filtered water and, after completion of the backwashing of a filter section, the filtrate compartment associated with that filter section is usually filled with filtered water. When the filter section that has been backwashed is returned to filter service, there is an initial period of relatively good effluent water from the filtrate compartment due to the clean backwash water remaining in the filtrate compartment. However, there then occurs a period in which the effluent quality from the backwashed filter section is substantially poorer than the average effluent quality of the filter apparatus. The poorer quality effluent usually continues while the foreign material that remained in the bed and above the bed during backwashing, passes out of the backwash filter section and until a filter mat begins to form on the surface of the bed. The filter mat which forms on the surface of the bed during a filter run is much more effective in removing the suspended material in the influent than the filter media alone and the highest quality effluent is obtained from each cell after a filter mat has formed on the surface. Although the degraded effluent from the filter section that has just been backwashed is mixed and diluted in the filter launder with the higher quality effluent from other filter sections, this degraded effluent does effect the average effluent quality during the filter run.

SUMMARY OF THE INVENTION

It is an object of the present invention to provide a filter apparatus of the type having a travelling backwash means that progresses along the filter bed to backwash sections of the filter in a predetermined sequence, and which minimizes deterioration of the average effluent quality from the filter apparatus due to the degraded effluent that occurs during the intitial period of flow through a filter section after it has been backwashed.

The present invention relates to improvements in filter apparatus of the type in which a bed of filter material is supported on a filter bed support above the bottom of the tank and a plurality of partitions define a plurality of fluid receiving compartments below the filter bed support. Influent is supplied to the tank above the filter bed and a plurality of filtrate ports are spaced apart along a port locus paralleling the carriage path with each filtrate port communicating a respective one of the fluid receiving compartments with a filtered effluent launder that extends along the port locus. Backwash means are carried by a carriage means that moves along the tank and carriage drive means drives the carriage means along the tank in a backwash run. The backwash means includes a collector hood carried by the carriage for movement along a path sequentially into overlying relation with different sections of the filter bed and a waste water pump connected to the collector hood for pumping waste water therefrom. The backwash means is operated during the backwash run to up-flow backwash different sections of the filter bed in a predetermined sequence.

In accordance with the present invention, a traveling cell scavenging means is provided to downflow scavenge and rinse each cell after it has been backwashed. The cell scavenging means includes a fluid intake head and means mounting the fluid intake head on the carriage means for movement into juxtaposition with the filtrate ports associated with each filter section after it has been backwashed by the backwash means to downflow scavenge each filter section subsequent to backwashing the same.

The backwash means preferably includes a backwash head mounted on the carriage means for movement along the port locus to supply backwash water to the filtrate ports in a predetermined sequence. The fluid intake head is spaced from the backwash head in a direction opposite the direction of movement of the carriage in a backwash run and the scavenging means is operative when the carriage is moved in the backwash run to sequentially withdraw fluid from each filtrate port and down-flow scavenge the associated filter cell subsequent to the backwashing of each filter cell.

DETAILED DESCRIPTION

Figure 1:
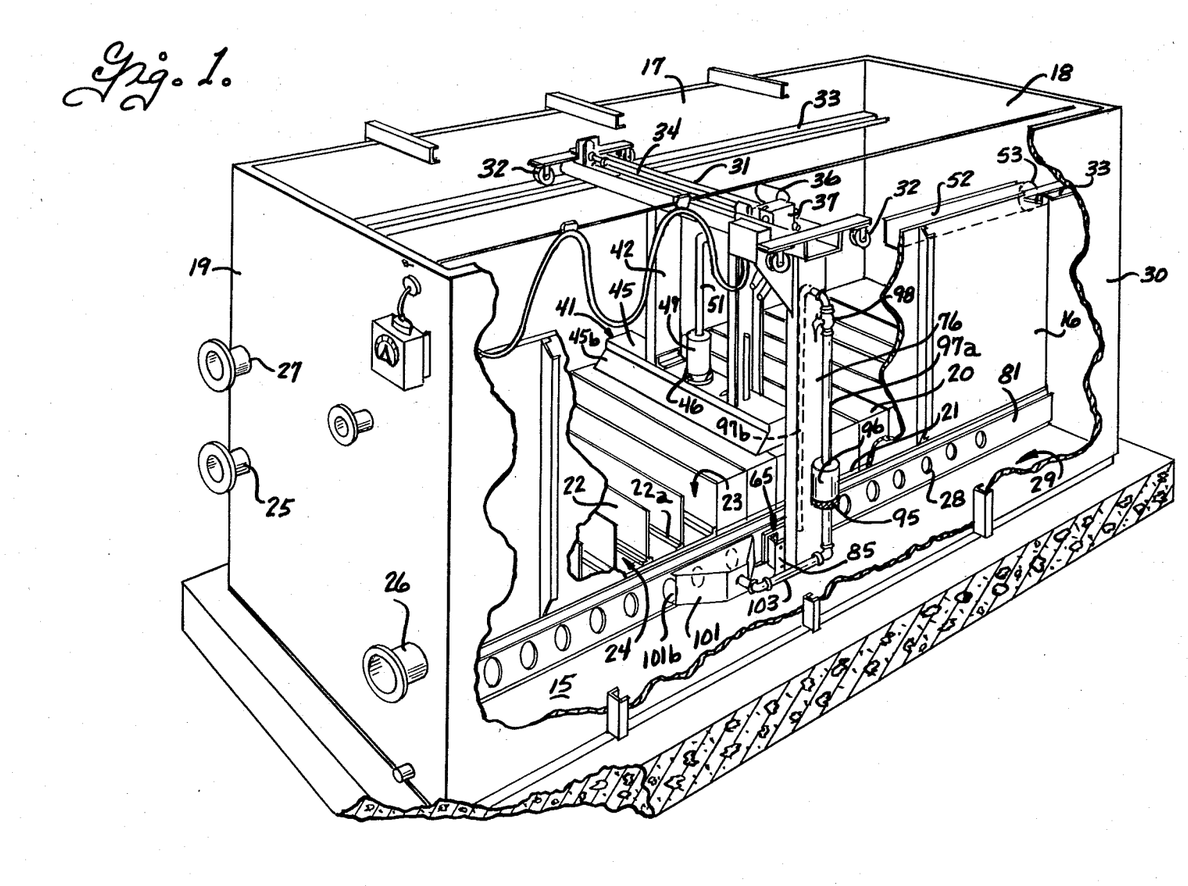
FIG. 1 is a perspective view of a filter apparatus embodying the present invention, with parts broken away to illustrate details of construction.

The filter apparatus in general includes a tank, conveniently of rectangular configuration and including a bottom wall 15, spaced side walls 16 and 17 and end walls 18 and 19. A filter bed of particulate material 20 is supported on a generally horizontal filter bed support 21 above the bottom of the tank, and generally upright partitions 22 extend crosswise of the lower portion of the tank between the side walls and define filtrate compartments 24 below the filter bed support. The filter bed support is conveniently in the form of porous slabs or apertured plates, disposed between the partitions and supported thereon as by rails 22a (FIG. 1). In the preferred embodiment illustrated, the partitions 22 also extend upwardly in the bed and separate the bed into filter sections or cells 23 above the filter bed support. The water or fluid to be filtered is supplied to the tank at a level above the bed of filter material and may be supplied through an influent line 25 that extends into one end of the tank as shown in FIG. 1, or through an influent channel that extends along the tank as shown in U.S. Pat. No. 4,152,265. The fluid passes downwardly through the filter bed and through the filter bed support and into the filtrate compartment 24 below the filter bed support. A plurality of filtrate outlet ports 28, at least one for each filtrate compartment, are provided in the side wall 16 and communicate with one end of the respective filtrate compartment. An outer wall 30 (FIG. 1) is spaced from the wall 16 and defines a filtrate launder 29 that extends along the length of the tank to receive filtered water from the filtrate ports. An overflow outlet 27 is provided in the tank at a level above the influent line 25 and is arranged to pass water from the tank to the overflow outlet when the liquid reaches a preselected upper level. A filtered water outlet 26 communicates with the filtered fluid launder 29 and is spaced above the bottom of the launder to maintain the liquid level in the launder at a level above the top of the bed and below the level of the liquid in the tank. The tank can be formed of any suitable material, for example metal as shown in the drawing, or concrete as shown in U.S. Pat. No. 4,152,265. While the tank shown herein is of rectangular configuration, it is apparent that the tank could be of circular configuration with the partitions arranged to form generally wedge shaped filtrate compartments.

The filtrate cells are progressively backwashed by a travelling backwash apparatus carried by a bridge or carriage 31. The carriage is supported by flanged wheels 32 for movement on a track 33 in a generally horizontal carriage path along the tank. The carriage 31 is reversibly driven along the track as by a motor 36 that drives a shaft 34 through speed reducing drive 37. The shaft 34 can be connected to drive the wheels 32 as described in the aforementioned U.S. Pat. No. 4,152,265 or, alternatively, can drive sprockets at opposite ends of the shaft that mesh with chains (not shown) extending lengthwise of the tank.

The backwash apparatus includes a collector hood 41 that is suspended from the carriage 31 as by support members 42, for movement along a path closely adjacent the upper surface of the filter bed 20. As shown in FIG. 1, the collector hood has a length measured crosswise of the path of travel of the carriage which is only slightly less than the spacing between the side walls 16 and 17 of the tank to span the width of the tank, and the hood is positioned to extend closely adjacent the surface of the bed. The hood has a channel-shaped configuration and includes a hood top 45 and hood sides 45a and 45b that extend downwardly from the hood top and terminate with their lower edges closely adjacent the surface of the bed. The lower ends of the hood sides 45a and 45b are preferably spaced apart in a direction lengthwise of the tank a distance at least equal to the spacing of the cell partitions 22 and preferably substantially greater than the spacing of the cell partitions. A distributor pipe 48 (FIG. 2) is provided in the hood and extends substantially the length of the hood with openings spaced apart therealong to more evenly distribute withdrawal of fluid along the length of the collector hood. A waste water pump 46, driven by a motor 49, has its inlet connected to the distributor pipe 48 to withdraw waste water from the hood and its outlet connected through a discharge pipe 51. The outlet end of the discharge pipe 51 is arranged to discharge into a waste water trough 52 that extends the length of the tank. Water from the waste water trough 52 flows through a waste water outlet 53, conveniently formed in the end wall 18 of the tank.

During the filtration process a substantial portion of the material in the fluid being filtered deposits on the surface of the bed and can accumulate in the form of a relatively dense mat. A scarifying means is provided in the hood to break up and loosen the mat on the surface of the bed. This scarifying means may, for example, be of the type disclosed in the aforementioned U.S. Pat. No. 4,152,265 and which includes blades 55 formed of a resilient flexible material such as synthetic resin material that are preferably spaced apart at their lower ends a distance approximating the spacing of the cell partitions 22 so as to extend upwardly from the cell partitions at each side of the filter cell being backwashed. Openings 55a are provided in the lower portions of the blades 55 to allow filter material to pass therethrough during movement of the hood along the bed, to agitate and loosen the filter material adjacent the surface of the bed.

Figure 3:
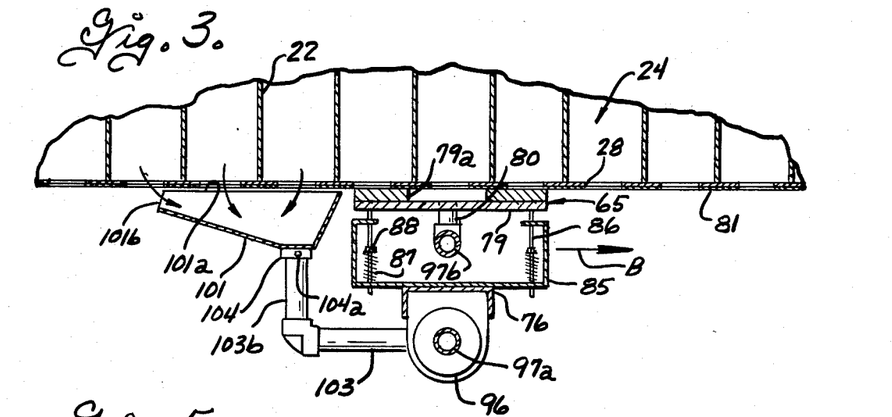
FIG. 3 is a fragmentary horizontal sectional view taken on the plane 3—3 of FIG. 2.

A backwash head 65 is attached to one end of the carriage 31 for movement therewith and, as best shown in FIG. 1, an arm 76 is attached at its upper end to one end of the carriage and extends downwardly into the filtrate launder 29 to a level adjacent the filtrate ports 28. The backwash head includes a shoe 79 adapted to slidably engage a guide plate 81 having openings at spaced locations therealong, each of which registers with a respective one of the filtrate ports 28. The guide plate may, for example, be formed of a wear resistant synthetic resin material. The shoe 79 has an elongated opening 79a therein adapted to move into and out of registry with the filtrate ports 28, and a backwash water supply pipe 80 communicates with the opening 79a to supply backwash fluid to the filtrate ports. The head 65 is resiliently biased laterally of the arm 76 against the guide plate 81 and, as shown in FIG. 3, is mounted on guide pins 86 that are attached to the head 65 and slidably extend through openings in a bracket 85 attached to the arm 76. Springs 87 are interposed between the bracket 85 and a stop 88 on the guide pins to yieldably urge the shoe into engagement with the guide plate. The filtrate ports 28 are centered relative to the respective filter cell 23 and the center-to-center spacing of the filtrate ports 28 therefore corresponds to the width of the filter cells. In the preferred embodiment shown, the opening 79a in the backwash shoe has a length corresponding to the center-to-center spacing of the filtrate ports 28, and the filtrate ports have a diameter corresponding to one-half the cell width and are spaced apart a distance equal to one-half the cell width. With this arrangement, the elongated opening 79a in the shoe will start to cut off flow to the filtrate port of one cell at about the same time it starts to introduce backwash fluid into the filtrate port associated with the next succeeding cell and, when the opening 79a moves into full communication with the filtrate port in the next succeeding cell, it shuts off communication of the filtrate port of the preceding cell. The opening 79a remains in full communication with the filtrate port associated with each cell while the carriage travels a distance approximately equal to one-half the cell width, before it begins to communicate with the filtrate port associated with a succeeding cell. Thus, full backwash flow is supplied to each cell while the carriage moves a distance corresponding to one-half the cell width and the flow to that cell is thereafter gradually cut off while the flow to the next succeeding cell is initiated.

Backwash water is supplied to the backwash head 65 by a backwash pump 95 driven by a motor 96. The backwash pump is preferably of the centrifugal type and the motor 96 is preferably of a submersible type so the motor and pump can be mounted as a unit adjacent the lower end of the arm 76 for movement with the carriage. The backwash pump 95 has an inlet 95a at its lower end and the outlet of the backwash pump is connected through a delivery conduit 97a, 97b to the backwash water supply pipe 80 in the backwash head 65 to supply backwash water thereto during backwashing. A flow rate adjusting valve 98 (FIG. 1) is provided in the backwash delivery conduit 97a, 97b to facilitate adjustment of the backwash flow rate.

Figure 2:
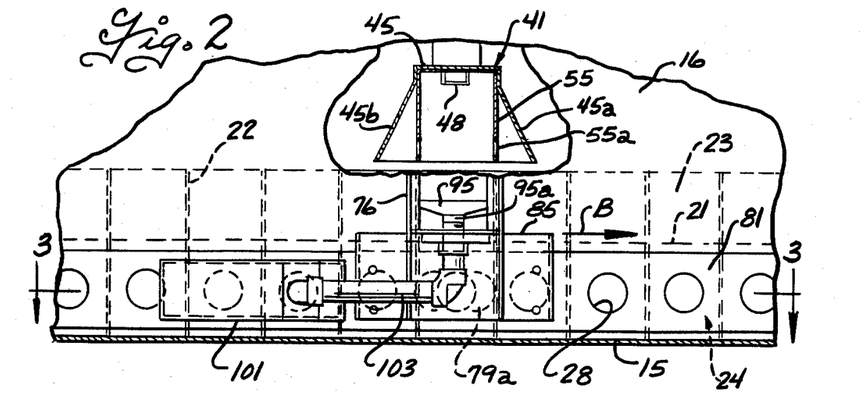
FIG. 2 is a fragmentary vertical sectional view of the filter apparatus shown in FIG. 1.

In accordance with the present invention, a cell scavenging means is provided in the filter apparatus and arranged to effect downflow and scavenging of each filter cell after it has been backwashed. In general, the cell scavenging means includes a fluid intake head 101 mounted on the carriage 31 for movement therewith sequentially into juxtaposition with each of the filtrate ports 28. The fluid intake head is spaced from the backwash head 65 in a direction opposite the direction of movement of the carriage during its backwash run, and the scavenging means is operative during movement of the carriage in its backwash run to sequentially withdraw fluid from each filtrate port and downflow scavenge the associated filter cell subsequent to backwashing of each filter cell. In the preferred embodiment illustrated in FIGS. 1–3, the inlet 95a of the backwash pump 95 is connected through pipes 103 to the fluid intake head 101 so that the fluid scavenged from the filter cell after it is backwashed is utilized in the backwashing of a succeeding cell. The fluid intake head can be sized to register with only one filtrate port at a time. However the rate of flow of fluid required to properly backwash a cell is substantially higher than the rate of downflow through a filter cell in a normal filter run and provision is made for enhancing the flow to the backwash pump above that which is obtained from normal downflow through a single filter cell. In the embodiment of FIGS. 1–3, the collector hood 101 is elongated in a direction paralleling the path of movement of the carriage during a backwash run so that the head communicates with at least two filter cells at all times. The fluid intake head can be constructed and arranged to form a sliding seal with the guide plate. However, since the backwash flow rate is substantially higher than the normal downflow service rate of a filter cell, it is not necessary to maintain a running seal between the fluid intake head 101 and the filtrate ports. Thus, the fluid intake head 101 can have its edge 101a spaced a slight distance from the guide plate 81 as shown in the drawings so that some water can also flow into the intake head from the filtrate launder 29, to make up the required backwash flow rate. As best shown in FIG. 3, the trailing end 101b of the fluid intake head defines a restricted opening that extends adjacent a third fluid intake port to receive some fluid therefrom while also allowing additional fluid to enter the intake head from the filtrate launder 29. The head 101 is preferably mounted for adjustment toward and away from the guide plate 81 and port locus and, as shown, has a collar 104 attached to the pipe 103, and which collar can be adjustably locked to an end portion 103b of the pipe 103 as by a locking screw 104a.

The filter apparatus of the embodiment of FIGS. 1–3 is arranged to effect sequential backwashing and subsequent sequential scavenging of the cells when the carriage is moved in only one direction along the tank, for example to the right as viewed in FIGS. 1–3 and as indicated by the arrow B. Backwashing and scavenging is stopped during return movement of the carriage by stopping the motor 96 for the backwash pump 95 and the motor 49 for the waste water pump 46d, during return of the carriage. It is contemplated that the carriage can be driven in continuous fashion during the backwash run or, alternatively, that the carriage can be driven in step fashion with a dwell at each filter cell to increase the backwash time. Such continuous and intermittent or step-type drives for the backwash carriage are well known in the art and detailed description is accordingly deemed unnecessary. While the embodiment of FIGS. 1-3 is arranged to effect backwashing and scavenging when the carriage is moved from left to right as viewed in FIGS. 1-3, it is deemed apparent that the filter apparatus could be arranged for backwashing and scavenging from right to left by merely positioning the fluid intake head on the right side of the backwash head, and operating the backwash and filtrate pumps during movement of the carriage from the right to the left.

In order to allow the filtrate bed in a cell to settle after backwashing and before scavenging, the fluid intake head 101 is spaced from the backwash head a distance such that there is at least one cell intermediate the cell being backwashed by the backwash means and the cell being scavenged by the cell scavenging means. Means are also advantageously provided to block flow through the filtrate ports on either side of the cell that is being backwashed by the backwash head, to inhibit flow through those cells. Blocking of the filtrate ports on either side of the cell being backwashed can be effected by portions of the backwash shoe as shown in FIGS. 2 and 3, or by pads or shoes separate from the backwash shoe.

Figure 4:
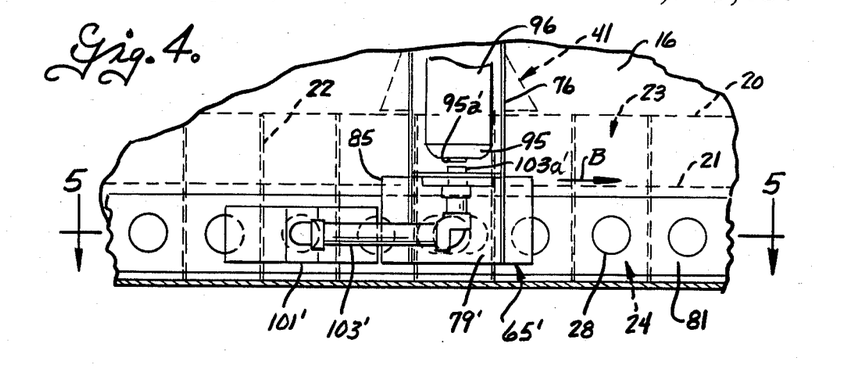
FIG. 4 is a fragmentary vertical sectional view illustrating a modified form of the invention.
Figure 5:
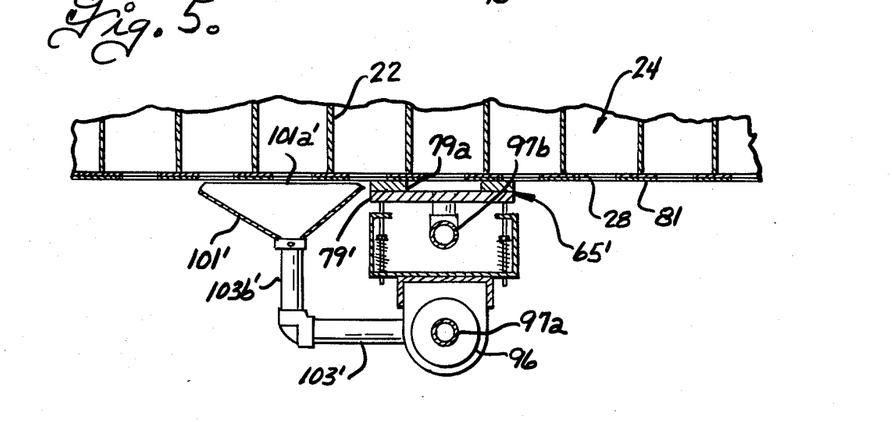
FIG. 5 is a fragmentary horizontal sectional view taken on the plane 5—5 of FIG. 4.

A modified form of the invention is illustrated in FIGS. 4 and 5 and like numerals are used to designate the same parts with like numerals followed by the postscript' used to designate modified parts. In this embodiment, the backwash shoe 79' is arranged so that it does not block flow through the filtrate ports on either side of the cell being backwashed and the fluid intake head 101' is constructed and arranged to extend closely adjacent the trail side of the backwash shoe to communicate with filtrate port of each cell immediately after the cell has been backwashed. The fluid intake head is connected through a pipe 103' to the inlet 95a of the backwash pump to supply backwash water thereto. As previously described, the rate of flow required for backwashing a cell is substantially greater than the rate of flow through a single filter cell during a filter run and the fluid intake head 101' is accordingly elongated to communicate with several filtrate ports at a time and the intake head is adjusted along the section 103b' of pipe 103' so that the inlet end 101a' of the fluid intake head is spaced slightly from the guide plate 81 to allow some in-flow of fluid to the intake head from the filter launder 29, while still withdrawing sufficient fluid from the filter compartments juxtaposed to the intake head to effect adequate scavenging. In order to prevent starving of the backwash pump during movement of the scavenging head between adjacent filtrate ports, the end 103a' of the pipe 103' is aligned with but spaced a short distance from the inlet 95a' of the backwash pump 95 to provide an opening therebetween as shown in FIG. 4, so that the backwash pump can also draw fluid from the filtrate launder 29 when flow in through the intake head is restricted. Since the end 103a' of the pipe 103' is aligned with the inlet of the pump, the pump will preferentially draw fluid through the pipe 103' until the flow into the intake head 101' is restricted as will occur during movement of the intake head between filtrate ports. The end 103a' of the pipe 103' is advantageously mounted for adjustment toward and away from the intake opening 95a' of the backwash pump to assure that the backwash pump has a minimum in-flow of fluid to prevent cavitation during movement of the intake head between the filtrate ports. As in the preceding embodiment, the backwash head and scavenging head are arranged so as to effect sequential backwashing and subsequent scavenging of the backwashed cell, when the carriage is moving in a direction from left to right, it being apparent that the scavenging head could be positioned on the right side of the backwash head to enable sequential backwashing and scavenging when the carriage is moved from right to left. Alternatively, since the flow rate required for backwashing a cell is substantially higher than the downflow rate during a filter run, a pair of fluid intake heads could be provided, one on each side of the backwash head, to enable backwashing and scavenging when the carriage is moved in either direction. With such an arrangement, the fluid intake head that trails the backwash head during movement of the carriage would perform a scavenging function while the one at the lead side of the backwash head would function as a supplemental source of water for the backwash pump. As in the preceding embodiment, the outlet of the backwash pump is connected as through pipes 97a, 97b to the inlet pipe 80 of the backwash head 65, to supply the backwash water thereto.

Figure 6:
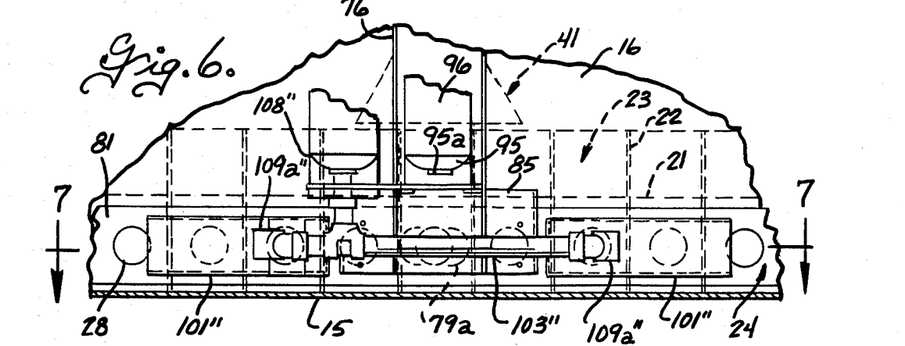
FIG. 6 is a fragmentary vertial sectional view illustrating a further modified form of the invention.
Figure 7:
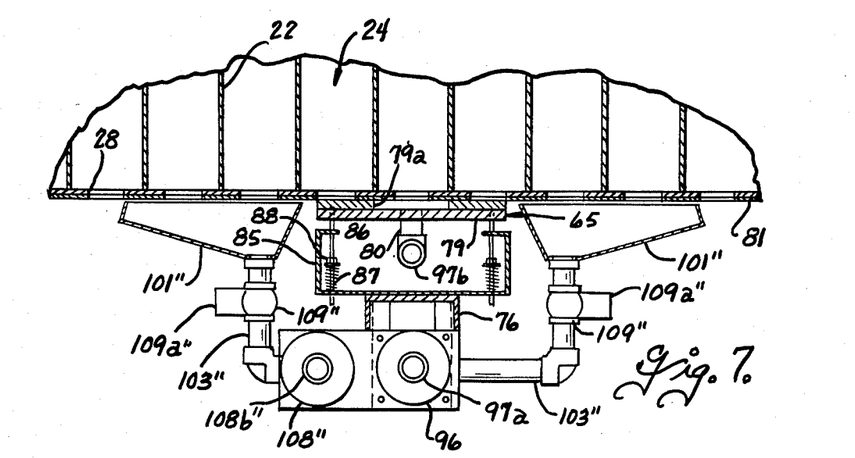
FIG. 7 is a fragmentary horizontal sectional view taken on the plane 7—7 of FIG. 6.

A third embodiment of the invention is illustrated in FIGS. 6 and 7 and like numerals are used to designate the same parts with like numerals followed by the postscript" used to designate modified parts. In this embodiment, the backwash pump 95 has its intake 95a arranged to communicate directly with the filtrate launder 29 to receive backwash fluid from the filtrate launder and its outlet connected to pipes 97a, 97b to the inlet 80 of the backwash head to supply backwash water thereto. A separate scavenging pump 108" is provided and connected through piping 103" to a scavenging head 101". As previously described, the scavenging head must be located relative to the backwash head so as to trail the backwash head during movement along a backwash run. In order to enable backwashing and scavenging during movement of the carriage in either or both directions along the tank, a scavenging head is provided at each side of the backwash head. A valve 109" is advantageously provided in the piping 103" leading to each of the fluid intake heads 101", and the valves are each provided with an actuator 109a" which can be selectively operated by a means (not shown) to shut off flow from the intake head that leads during movement of the carriage along the tank. The outlet 108b" of the scavenging pump 108" is connected through a discharge pipe (not shown) that can be arranged to either discharge into the waste water trough 52 or to deliver the scavenged water back to the tank, preferably adjacent the inlet end of the tank. As in the embodiment of FIGS. 1-3, the fluid intake heads are spaced from the backwash head a distance such that there is at least one cell intermediate the cell being backwashed by the backwash means and the cell being scavenged by the cell scavenging means. In addition, a means such as an extension on the backwash shoe is provided to block flow to the filtrate port on either side of the cell being backwashed, to prevent flow through those cells during backwashing. A means such as a flow control valve (not shown) can be provided in the outlet 108b" of the scavenge pump to adjust the flow rate to the desired scavenging rate. While valves 109" are herein shown provided in the piping 103" leading from the dual intake heads 101", to enable shut-off of flow through the fluid intake head that leads during movement of the carriage along the tank, it is apparent that the valves could be omitted and fluid drawn in through both intake heads during movement in either direction, with a consequent somewhat larger waste of water. Alternatively, one of the intake heads 101" could be omitted and the filter arranged for backwashing and scavenging when the carriage moves in only one direction along the tank.

From the foregoing it is believed that the construction and operation of the filter apparatus will be readily understood. Initiation and control of the backwashing operation can be effected manually or automatically as is well known in the art. The scavenging means is arranged to scavenge the filter cells after they have been backwashed and the duration and amount of scavenging can be varied by changing the number of cells that the scavenging head communicates with during backwashing of each cell and adjusting the clearance between the fluid intake head and the guide plate 81. Thus, when the fluid intake head is connected to the inlet of the backwash pump, the scavenging time will be the same as the backwash time and the amount of scavenging of each cell can be increased by arranging the backwash head to communicate with a plurality of cells and by positioning the intake head closely adjacent the guide plate. Conversely, the amount of scavenging of each cell can be decreased by arranging the fluid intake head so that it communicates with only one or two cells at a time and by spacing intake head a greater distance from the guide plate to withdraw a greater portion of the water from the filtrate launder. Alternatively, when a separate scavenge pump is used as shown in FIGS. 6 and 7, the scavenge pump can be operated for the same time as the backwash pump, or for a greater or lesser time, as by a separate scavenging timer, as required to achieve the desired amount of scavenging of each cell. As previously described, the poorer quality effluent begins to pass from a backwashed cell after the higher quality backwash water has passed from the underdrain compartment of the cell. The amount of scavenging from each backwashed cell is accordingly made substantially greater than the volume of the cell underdrain compartment, and preferably exceeds the volume of the filtrate compartment by an amount substantially greater than the volume of fluid in the filter media of the backwashed cell.

The embodiments of the invention in which an exclusive property or privilege is claimed are defined as follows:

1. A filter apparatus of the type including a tank, a filter bed support in the tank supporting a bed of filter material above the bottom of the tank, carriage means mounted for movement along the tank in a carriage path, influent means for supplying an influent to the tank above filter bed, a plurality of partitions extending transverse to the carriage path and spaced apart therealong and defining a plurality of fluid receiving compartments below the filter bed support, the tank including a filtered water effluent launder extending along the carriage path, a plurality of filtrate ports spaced apart along a port locus paralleling said carriage path with each filtrate port providing open communication between a respective one of the fluid receiving compartments and the filtered water effluent launder, carriage drive means for driving the carriage means along the carriage path in a backwash run, travelling backwash means including a backwash collector hood mounted on the carriage means for movement therewith in said backwash run sequentially into overlying relation with different sections of the filter bed, the backwash means including waste water pump means connected to the collector hood and operative to pump waste water from the hood, means for operating the backwash means during the backwash run to up-flow backwash different sections of the filter bed in a preselected sequence, cell scavenging means including a fluid intake head, means mounting the fluid intake head on the carriage means for movement into juxtaposition with the filtrate port associated with each filter section after it has been backwashed by the backwash means, and means for operating the cell scavenging means during the backwash run to draw fluid into the fluid intake head through the filtrate port juxtaposed thereto and down-flow scavenge each filter section subsequent to backwashing of the same.

2. A filter apparatus according to claim 1 wherein the fluid intake head is arranged in relation to the collector hood such that, when the collector hood overlies a filter section associated with one of said filtrate ports, the fluid intake head is positioned in juxtaposition with at least one other filtrate port that is spaced from said one of said filtrate ports in a direction opposite the direction of movement of the carriage means in the backwash run.

3. A filter apparatus according to claim 2 including means connected to said fluid intake head for supplying fluid to the filtrate port associated with the filter section that lies below the collector hood.

4. A filter apparatus of the type including a tank, a filter bed support in the tank supporting a bed of filter material above the bottom of the tank, carriage means mounted for movement along the tank in a carriage path, a plurality of partitions extending transverse to the carriage path and spaced apart therealong separating the bed into a plurality of open top filter cells above the filter bed support and defining a plurality of fluid receiving compartments below the filter bed support each individual to a respective one of the filter cells, influent means for supplying an influent to the tank above the bed, a plurality of filtrate ports spaced apart along a port locus paralleling said carriage path with each filtrate port communicating with a respective one of the fluid receiving compartments, a filtered water effluent launder extending along said port locus and communicating with said filtrate ports, carriage drive means for driving the carriage along the carriage path in a backwash run, travelling backwash means including a backwash head carried by said carriage means for movement along said port locus sequentially into communication with each of said filtrate ports, the backwash means including a collector hood carried by the carriage means for movement along a path adjacent the upper surface of the filter bed sequentially into overlying relation with the top of each filter cell when the backwash head is in communication with the filtrate port associated with that filter cell, the backwash means including waste water pump means connected to the collector hood for pumping waste water therefrom, means for operating the backwash means during the backwash run to supply backwash fluid through the backwash head to the filtrate ports and to deliver waste water from the collector hood to sequentially up-flow backwash the filter cells in a preselected sequence, cell scavenging means including a fluid intake head carried by the carriage means for movement along said port locus sequentially into juxtaposition with each of the filtrate ports, the fluid intake head being spaced from the backwash head in a direction opposite the direction of movement of the carriage means in said backwash run, and means for operating the cell scavenging means during the backwash run to draw fluid into the fluid intake head through the filtrate port juxtaposed thereto and down-flow scavenge the associated filter cell subsequent to backwashing of each filter cell.

5. A filter apparatus according to claim 4 wherein the fluid intake head is spaced from the backwash head a distance such that there is at least one cell intermediate the cell being backwashed by the backwash means and the cell being scavenged by the cell scavenging means.

6. A filter apparatus according to claim 5 including means carried by the carriage means for blocking flow through the filtrate port associated with the cell that lies intermediate the cell that is being backwashed by the backwash means and the cell that is being scavenged by the cell scavenging means.

7. A filter apparatus according to claim 6 wherein the fluid intake head has a length paralleling its path of movement to extend into juxtaposition to at least two adjacent ones of the filtrate ports.

8. A filter apparatus according to claim 4 wherein the fluid intake head is positioned relative to the backwash head to extend into juxtaposition to the filtrate port next adjacent the filtrate port with which the backwash head communicates.

9. A filter apparatus according to claim 4 wherein the carriage drive means drives the carriage means in continuous fashion during the backwash run.

10. A filter apparatus according to claim 4 wherein the carriage drive means drives the carriage means in intermittent fashion during the backwash run with the carriage means dwelling at each filter cell.

11. A filter apparatus according to claim 4 wherein the fluid intake head has a length paralleling its path of movement to extend into juxtaposition to at least two adjacent ones of the filtrate ports.

12. A filter apparatus according to claim 4 wherein the backwash means includes a backwash pump having an outlet connected to the backwash head and an inlet connected to the fluid intake head to receive at least a portion of the backwash fluid through said fluid intake head.

13. A filter apparatus according to claim 4 wherein the cell scavenging means includes a scavenge pump having an inlet connected to said fluid intake head.

14. A filtering apparatus according to claim 13 wherein said cell scavenge pump has its outlet connected to deliver fluid back to the tank.

15. A filter apparatus according to claim 13 wherein said cell scavenge pump has its outlet connected to deliver fluid to waste.

16. A filter apparatus according to claim 4 including a backwash pump having an outlet connected to the backwash head and an inlet connected to the fluid intake head to receive at least a portion of the backwash fluid through said fluid intake head, said fluid intake head having a length paralleling its path of movement to extend into juxtaposition to at least two adjacent ones of the filtrate ports.

17. A filter apparatus according to claim 4 including a port plate extending along said port locus and having said filtrate ports therein, said backwash head having a face slidably engaging said port plate and a backwash port in said face, said fluid intake head having an intake opening disposed adjacent said port plate but out of sliding engagement therewith.

18. A filter apparatus according to claim 17 including means for adjusting the fluid intake head in a direction laterally of the port plate.

19. A filter apparatus according to claim 4 including a backwash pump having an outlet connected to the backwash head and an inlet disposed in the filtered fluid launder below the liquid level therein, conduit connected to the fluid intake head and having an outlet end axially aligned with the inlet of the backwash pump, the outlet end of the conduit means and the inlet of the backwash pump defining a restricted opening arranged to allow water from the launder to enter inlet of the backwash pump when flow into the fluid intake head is restricted.

20. A filter apparatus of the type including a tank, carriage means movable in a carriage path along the tank, a filter bed support supporting a bed of filter material above the bottom of the tank, a plurality of partitions extending transverse to the carriage path and spaced apart therealong defining a plurality of fluid receiving compartments below the filter bed support, influent means for supplying an influent to the tank above the bed, a plurality of filtrate ports spaced apart along a port locus paralleling said carriage path with each filtrate port communicating with a respective one of the fluid receiving compartments, a filtered fluid launder extending along said port locus and communicating with said filtrate ports, carriage drive means for driving the carriage means along the carriage path, travelling backwash means including a backwash head carried by the carriage means for movement along a path extending along said port locus sequentially into juxtaposition with each of said filtrate ports and a collector hood carried by the carriage means for movement along a path adjacent the upper surface of the bed sequentially into overlying relation with the top of each filter cell when the backwash head is in juxtaposition with the filtrate port associated with that filter cell, the backwash means including waste water pump means connected to the collector hood for pumping waste water from the hood, means for operating the backwash means to supply backwash fluid to the backwash head and to pump waste water from the hood for up-flow backwashing the filter cells during movement of the carriage means in either direction along said carriage path, cell scavenging means including first and second fluid intake heads mounted on the carriage means for movement therewith along a path extending along the port locus and at relatively opposite sides of the backwash head sequentially into juxtaposition with each of the filtrate ports, the first intake head leading the backwash head during movement of the carriage in a first direction along the carriage path and the second intake head leading the backwash head during movement of the carriage in a second direction along the carriage path, means for operating the cell scavenging means to draw fluid into at least the fluid intake head that trails the backwash head during movement along the tank to sequentially withdraw fluid from each filtrate port and down-flow scavenge the associated filter cell.

21. A filter apparatus according to claim 20 including means for at least substantially restricting flow from the first fluid intake head when the carriage is moved in said first direction along the carriage path and for at least substantially restricting flow of fluid from the second intake head when the carriage is moved in the second direction along the carriage path.

22. A filter apparatus according to claim 20 including means on the backwash head for blocking flow through the filtrate ports associated with the cells on each side of the cell being backwashed, said first and second fluid intake heads being arranged to communicate with the filtrate ports that are adjacent the blocked filtrate ports.

23. A filter apparatus according to claim 20 wherein the backwash means includes a backwash pump having an outlet connected to the backwash head.

24. A filter apparatus according to claim 23 wherein the cell scavenging means includes a scavenge pump separate from the backwash pump and having an inlet connected to said fluid intake heads.

* * * * *

UNITED STATES PATENT AND TRADEMARK OFFICE
CERTIFICATE OF CORRECTION

PATENT NO. : 4,540,487
DATED : September 10, 1985
INVENTOR(S) : John K. Johnson et al It is certified that error appears in the above-identified patent and that said Letters Patent are hereby corrected as shown below:

Claim 19, column 12, line 9, insert -- means -- after "conduit".

Signed and Sealed this

Twenty-sixth Day of November 1985

[SEAL]

Attest:

DONALD J. QUIGG

Attesting Officer

Commissioner of Patents and Trademarks